United States Patent [19]

Senter et al.

[11] 4,360,178
[45] Nov. 23, 1982

[54] PIPE CLAMP

[76] Inventors: Robert Senter, 230 Termino, Long Beach, Calif. 90803; Millard Andrich, 3265 W. Lambert La., Tucson, Ariz. 85704

[21] Appl. No.: 16,312

[22] Filed: Feb. 28, 1979

Related U.S. Application Data

[63] Continuation-in-part of Ser. No. 865,958, Dec. 30, 1977, Pat. No. 4,157,800, which is a continuation of Ser. No. 712,234, Aug. 6, 1976, abandoned.

[51] Int. Cl.³ .............................. F16L 3/08; F16L 3/10
[52] U.S. Cl. .............................. 248/74 R; 24/255 SL; 248/65; 248/14 A
[58] Field of Search ...................... 248/74 R, 74 A, 70, 248/62, 68 R, 49, 65, 505; 24/255 SL, 257; 174/163 R, 164; 403/21, 326

[56] References Cited

U.S. PATENT DOCUMENTS

| | | | |
|---|---|---|---|
| 870,763 | 11/1907 | Chaffee | 24/20 TT |
| 973,532 | 10/1910 | McLaughlin | 24/20 TT |
| 983,093 | 1/1911 | Svenson et al. | 24/20 EE |
| 3,027,128 | 3/1962 | Liberty | 24/20 TT |
| 3,066,903 | 12/1962 | Tinnerman | 248/74 R |
| 3,126,184 | 3/1964 | Kropp | 174/164 X |
| 3,185,419 | 5/1965 | Kindorf | 248/74 R |
| 3,286,694 | 11/1966 | Landy | 248/71 X |
| 3,385,545 | 5/1968 | Patton | 248/74 R |
| 3,429,985 | 2/1969 | Czigler | 174/164 |
| 4,128,918 | 12/1978 | Wenk | 24/255 SL |

FOREIGN PATENT DOCUMENTS

| | | | |
|---|---|---|---|
| 2442414 | 3/1976 | Fed. Rep. of Germany | 248/74 R |
| 15890 | 2/1898 | Switzerland. | |

Primary Examiner—James T. McCall
Attorney, Agent, or Firm—Smyth, Pavitt, Siegemund, Jagger & Martella

[57] ABSTRACT

An improved pipe clamp for securing a pipe to a structural member consists of two associated elements which are broadly similar, except for structural details peculiar to the several embodiments, and which are disposed on opposite sides of the pipe facing each other. The pipe is retained within the clamp by a double-interlocking snap lock common to all embodiments. Each element includes a locking edge extending parallel to the pipe and also includes a tab extending from the element in a plane perpendicular to the pipe. The tab is tapered by a ramp which is relieved by a recess to provide a hook for engaging the locking edge of the associated element. The hook is engaged by squeezing the ends of the elements together, causing their ramps to ride up on the locking edges of the associated elements until the locking edge of each element snaps into the recess of the other element to produce a double interlocking of the elements embracing the pipe.

16 Claims, 8 Drawing Figures

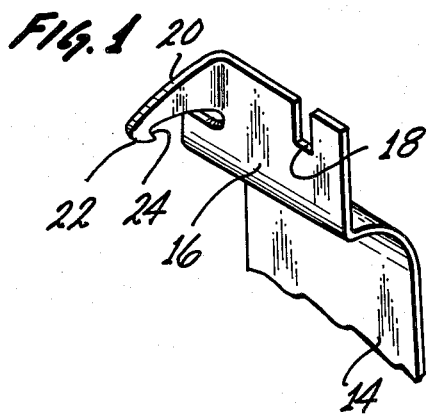
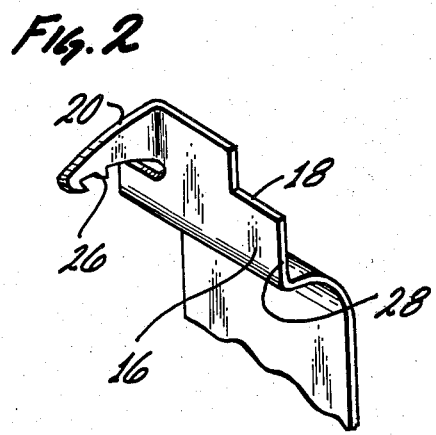
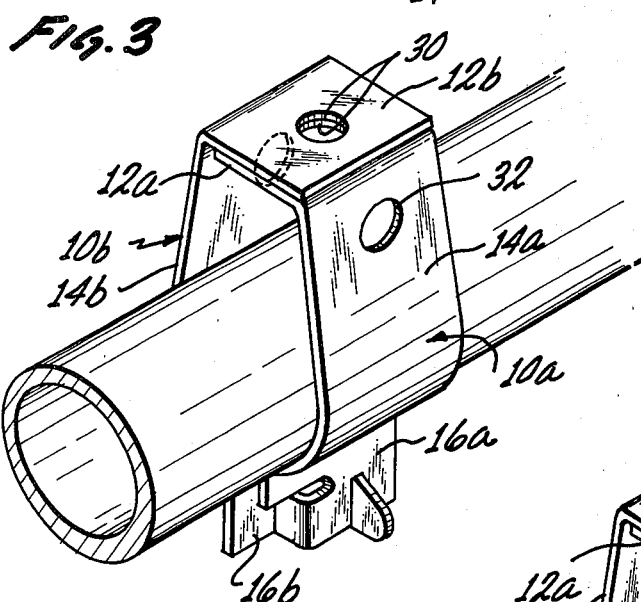
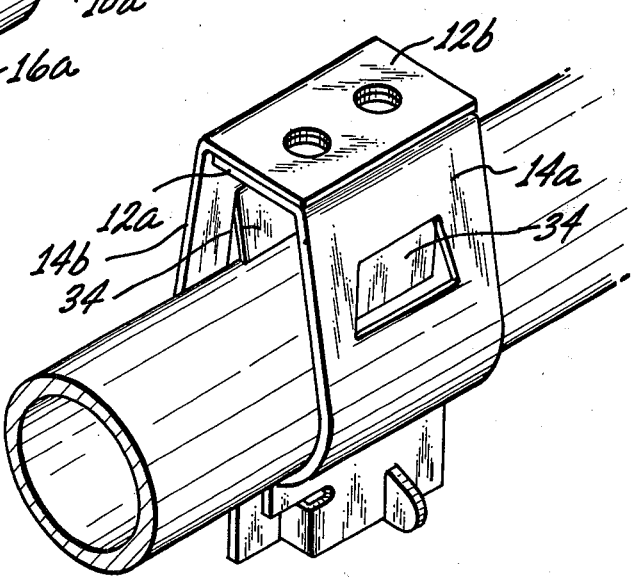

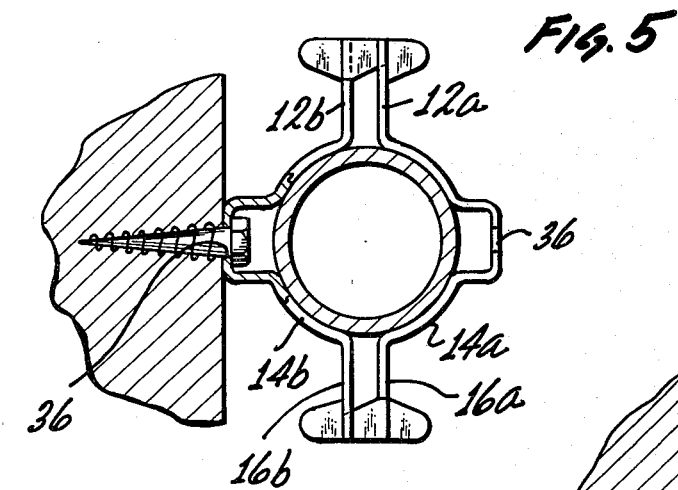
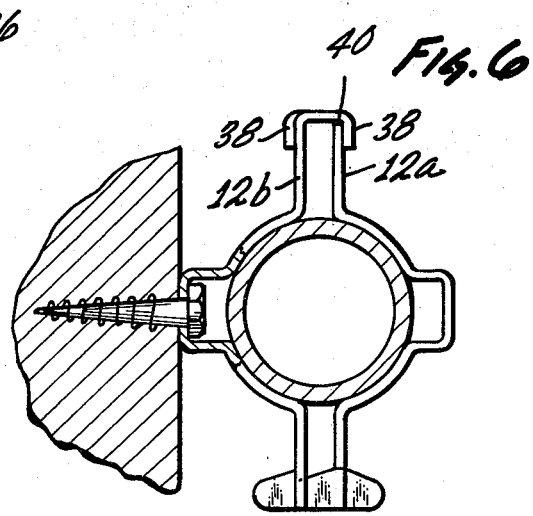
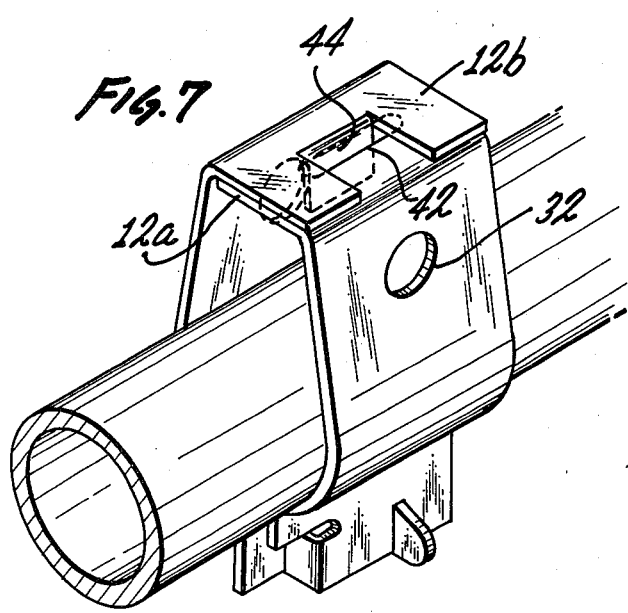
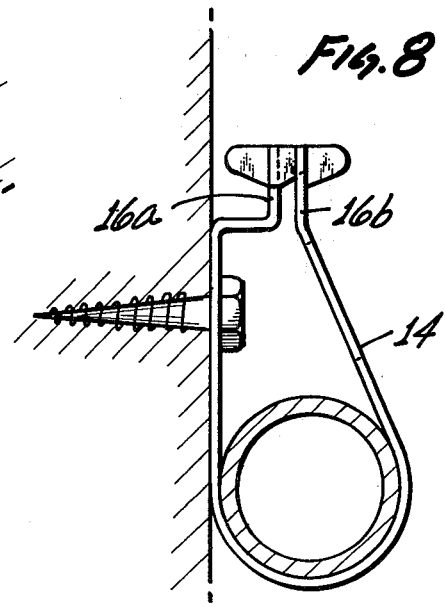

PIPE CLAMP

BACKGROUND OF THE INVENTION

The present application is a continuation-in-part of U.S. patent application Ser. No. 865,958, filed Dec. 30, 1977 by ROBERT SENTER and MILLARD ANDRICH for PIPE CLAMP, now U.S. Pat. No. 4,157,800 which issued June 12, 1979. Application Ser. No. 865,958 was, in turn, a continuation under 35 C.F.R. 1.60 of U.S. patent application Ser. No. 712,234 filed Aug. 6, 1976 by Robert Senter and Millard Andrich for PIPE CLAMP and now abandoned. Priority of Aug. 6, 1976 is claimed for subject matter in the present application that is common to application Ser. No. 712,234.

The present application discloses and claims several additional embodiments, all of which employ the basic snaplocking mechanism disclosed in application Ser. No. 712,234.

FIELD OF THE INVENTION

The present application is in the field of hardware for building construction and specifically relates to a pipe clamp for attaching a pipe to a fixed structural member such as a wall or a ceiling.

THE PRIOR ART

The desirability of fastening pipes to the structural portions of buildings such as walls and ceilings has been recognized for a very long time. Accordingly, much inventive work has been done in this field, and by now the field must be regarded as old and crowded.

In U.S. Pat. No. 2,345,650 issued Apr. 4, 1944, Attwood describes a pipe clamp for use in attaching a pipe to a channel in which the two halves of the pipe clamp are connected together by a nut and a bolt. Thus, the pipe clamp includes at least four parts. The mechanical installing the Atwood pipe clamp must insert one end of each half of the clamp into the channel, and while holding the halves in this position he must insert a bolt and tighten a nut. Normally, it would be necessary for the mechanic to carry both a screwdriver and a pliers for tightening the nut on the bolt.

In U.S. Pat. No. 3,139,261 issued June 30, 1964, Tinnerman shows in FIGS. 1–8 a clamp consisting of two identical halves. Each of the halves includes a locking member. To install the clamp it is necessary to squeeze the locking members together while simultaneously displacing them in the lengthwise direction of the pipe. This operation may be difficult to perform in some circumstances. In FIGS. 9–11 of the same patent, Tinnerman shows another type of locking member for a clamp having lugs extending radially outwardly from the pipe and which become lodged in holes in the opposite member. In this embodiment, a separate mechanical operation is required to depress one of the coupling elements radially toward the pipe so that it will pass below the other coupling element. Careful inspection will show that only one of the two lugs engages the opposite clamp half.

In German Pat. No. 670,887 issued on Jan. 26, 1939, Dutzmann shows in FIG. 8 a pipe clamp in which the halves of the clamp are not identical. In Dutzmann's clamp, the halves do not snap together because his structure includes no ramp for the locking member to ride up. Instead, the locking member includes a tongue which must be depressed with one tool while at the same time the ends of the clamp halves must be squeezed together with another tool so that the tongue can be inserted through an opening.

In U.S. Pat. No. 3,066,903, issued Dec. 4, 1962, Tinnerman again describes the embodiment shown in FIGS. 9 and 10 of U.S. Pat. No. 3,139,261 discussed above, and the comments given above are applicable.

In U.S. Pat. No. 3,185,419, issued May 25, 1965, Kindorf shows a pipe clamp consisting of two identical havles but in which there is no snap action. Each half includes a hook member and the hook members must be bent individually so that they will be retained in the locked position.

In U.S. Pat. No. 1,441,154, issued Jan. 2, 1923; , Johnson shows a hose clamp which is not suitable for attaching a pipe to a structural member and which is a composite structure whose halves are not identical. Johnson shows the use of more than one tooth on the locking member to permit various degrees of tension to be applied.

Several other patents are regarded as less revelent to the present invention. They will be discussed briefly in the following paragraphs.

In U.S. Pat. No. 3,145,962, issued Aug. 25, 1964, Kindorf shows a clamp having a snapping action and multiple teeth, in which two tangs extending from opposite sides of the clamp are deflected in the lengthwise direction of the pipe as the two free ends of the clamp are squeezed together.

In French Pat. No. 1,124,412, issued Oct. 10, 1956 to Tonna, there is shown a pipe clamp having a snap locking action, but in which the two halves are not identical.

In U.S. Pat. No. 2,972,461, issued Feb. 21, 1961, Balbach et al show a hose clamp which surrounds the hose and has a hook on one end which engages an aperture at the other end.

In U.S. Pat. No. 3,090,826, issued May 21, 1963, Cochran shows a wiring fastener having a barbed hook at one end which engages a mating structure located at another portion of the fastener.

A careful study of the above patents will indicate that each of the devices described has its particular shortcomings, and all of the above devices can be distinguished structurally from the present invention.

SUMMARY OF THE INVENTION

Many of the disadvantages of the pipe clamps known in the prior art are overcome by the pipe clamp of the present invention. In accordance with the present invention, the pipe clamp includes two end portions which, after a pipe has been positioned within the clamp, are squeezed together until they snap into a locked configuration in which the ends of the clamp are bound together by a double interlocking set of latches.

In accordance with the present invention, the end portions of the clamp are disposed ot extend outwardly from the pipe. Each end portion includes a locking edge extending parallel to the pipe, and further includes a tab which extends in a plane perpendicular to the pipe. Each of the tabs extends toward the opposing end of the clamp, and each tab includes a ramp relieved by a recess to provide a hook for engaging the locking edge of the opposite end of the clamp. The clamp is made of a resilient material such as sheet metal and is formed to such a shape that a moderate force is required to overcome the stiffness of the material when the ends of the clamp are squeezed together. Once the squeezing force is removed, the elastic restoring forces of the clamp material act to prevent the interlocked ends from becoming disengaged, by urging the locking edge of each clamp end against the recess of the hook on the opposing clamp end.

In the parent application, now U.S. Pat. No. 4,157,800 of which the present application is a continuation-in-part, there was described and shown a pipe clamp suitable for attaching a pipe at right angles to a channel. The disclosure of the parent application is incorporated herein by reference. In the present application, the double-interlocking snap-lock mechanism is employed in clamps suitable for affixing a pipe to a wall, a ceiling or other structural component of a building.

In several of the embodiments disclosed herein, the pipe clamp consists of two identical halves, also called elements. In one illustrative embodiment disclosed herein, the clamp consists of two halves which are slightly different in structure but which use the double-interlocking snap-lock described above. In another illustrative embodiment, the pipe clamp consists of a single unitary piece of sheet metal, or other suitable material, the ends of which are structured in such a manner as to permit use of the double-interlocking snap-lock also.

Once the pipe clamp of the present invention has been attached to the structural component such as a wall or a ceiling, and the pipe has been placed within the clamp, the clamp can be locked merely by squeezing the ends together with a pair of pliers. Thus, the clamp of the present invention can be locked with noteworthy ease.

The advantageous features of the various embodiments and their structures which enable these features will be better understood from the following description which relates to the accompanying drawings. It is to be understood, however, that the drawings are for the purpose of demonstrating and exemplifying the invention and should not be construed as limiting the scope of the invention.

BRIEF DESCRIPTION OF THE DRAWINGS

FIG. 1 is a perspective view showing the interlocking mechanism at each end of the clamp in a preferred embodiment;

FIG. 2 is a perspective view broken away and showing an alternative embodiment of the interlocking structure;

FIG. 3 is a perspective view showing a preferred embodiment of the pipe clamp according to the present invention;

FIG. 4 is a perspective view showing a second embodiment of the present invention;

FIG. 5 is an end view showing a third embodiment of the present invention;

FIG. 6 is an end view showing a fourth embodiment of the present invention;

FIG. 7 is a perspective view showing a fifth embodiment of the invention; and

FIG. 8 is an end view showing a sixth embodiment of the invention.

DETAILED DESCRIPTION OF THE PREFERRED EMBODIMENT

Turning now to the drawings in which like parts are denoted by the same reference numeral throughout, there is shown in FIG. 1 a perspective view of a portion of a clamp that is common to all of the embodiments described herein. The portion shown in FIG. 1 includes elements which provide the unique double-interlocking snap-lock which permits the clamp to be locked simply by squeezing the two parts together. As will be clear from the drawings, all of the clamps except that of FIG. 8 include two similar halves, which are identical in several of the embodiments. Thus, as typified by the preferred embodiment in FIG. 3, the clamp includes two associated halves 10a and 10b, also referred to herein as elements. For purposes of description, each of the elements 10a, 10b includes a first end portion 12a, 12b; a midsection 14a, 14b; and a second end portion 16a, 16b. From FIG. 3 it is seen that the two associated elements 10a, 10b are disposed on opposite sides of the pipe and that they face each other. It is seen that the elements extend circumferentially around the pipe and interlock with one another to secure the pipe. It is seen that the midsection 14a, 14b contacts the pipe and extends circumferentially partially around the pipe. As will be seen below, in various embodiments, the first end portions and the midsections are adapted in various ways to permit the clamp to be affixed to a wall or a ceiling, or some other structural component of a building, a vehicle, or like structure.

FIG. 1 shows a portion of one of the elements in a perspective view to permit the double-interlocking snap-lock common to all of the embodiments of the present invention to be shown more clearly. Specifically, FIG. 1 shows a second end portion 16 and part of a midsection 14. The second end portion 16 is disposed relative to the midsection 14 in such a way that it extends outwardly from the pipe, as will be clear from the figures. The second end portion 16 includes a locking edge 18 which extends parallel to the pipe.

The second end portion 16 also includes a tab 20 which extends perpendicularly from the second end portion 16 so that when the clamp is applied to the pipe the tab 20 lies in a plane perpendicular to the pipe. The tab 20 also includes a ramp 22 which is relieved by a recess 24. As seen in FIG. 1, the ramp 22 and the recess 24 form a hook or barb on the tab, and the hook engages the locking edge of the associated element. With the two associated elements facing one another on opposite sides of the pipe, the second end portions of the elements are squeezed together causing the ramp of each element to be deflected to ride up on the locking edge of the other element until, with further squeezing, the locking edge of each element snaps into the recess of the other element to produce a double-interlocking of the elements embracing the pipe.

In a preferred embodiment, the elements are made of a resilient material, and it is appreciated that as the second end portions are squeezed together an elastic restoring force is produced in each element which biases the recess of each tab against the locking edge of the opposite element to maintain the clamp in the locked configuration. In the best mode of practicing the invention, the elements are formed of a resilient sheet metal.

FIG. 2 shows an alternative embodiment of the portion of the element shown in FIG. 1. In the embodiment of FIG. 2, the tab 20 is provided with a second hook 26. The provision of the second hook 26 can be advantageously used to permit the clamp to accomodate pipes of various slightly different sizes or to permit the clamp to be locked selectively more tightly or less tightly as dictated by the circumstances of its use. Also, in FIG. 2, the locking edge 18 extends to the edge 28 of the second end portion 16. In the embodiments shown in FIGS. 1 and 2, the ramps 22 have a shape which includes a convex arch. In other embodiments, the ramp 22 may be straight or concave, although the convex arch is deemed to be the best mode.

Returning now to the embodiment shown in FIG. 3, it is seen that the first end portions 12a, 12b are provided with holes 30 so positioned that when the clamp is applied to the pipe the holes 30 overlap to permit a fastener to be inserted through the holes for the purpose of holding the first end portions 12a, 12b together. The same fastener can also be used to affix the clamp to a structural component such as the ceiling of a room. As shown in the embodiment of FIG. 3, the midsection 14 may also be provided with holes 32 through which a fastener can be passed to affix the clamp to a wall or other inclined structure. In one embodiment the hole 32 of the element 10a is sufficiently large to permit a tool to be inserted through it for access to a fastener passing through the hole of the associated element 10b and affixing it to a structural component.

A second embodiment of the clamp is shown in FIG. 4, which is generally similar to the embodiment of FIG. 3 with the exception that the first end portions 12a, 12b are each provided with two holes which are positioned so that they will be aligned in registration when the first and second end portions 12a, 12b are overlapped as shown in the figure. Further, the midsections 14 of the elements 10a, 10b include panels 34 which are knocked in to restrain the pipe within the clamp. In a third embodiment of the present invention shown in FIG. 5, the midsections 14a, 14b include holes 36 through which a fastener can be passed to fasten either one of the element to a structural component. The halves of the clamp include second end portions 16a, 16b having the structure described in connection with FIG. 1 above, but unlike the preceding embodiments, the first end portions 12a, 12b also form the double-interlocking snap-lock described in connection with FIG. 1.

A fourth embodiment, shown in FIG. 6, is generally similar to the embodiment of FIG. 5 and differs from it in that the first end portions 12a, 12b are shaped to provide a different type of interconnection. In the embodiment shown in FIG. 6, sections of the first end portions 12a, 12b are bent over into the shape of a "7" to provide a retaining lip 38 for holding the two first end portions 12a, 12b together. Other sections of the first end portions 12a, 12b laterally adjacent the bent-over portion include an edge 40 extending parallel to the pipe which is retained by the retaining lip 38.

In the embodiments described thus far, the elements 10a, 10b are substantially identical. In contrast, in the fifth embodiment shown in FIG. 7, the elements 10a, 10b are not substantially identical. Specifically, the first end portion 12a includes an elongated aperture or slot 42 and the first end portion 12b includes a bent-over panel or lug 44 which extends towards the pipe when the elements are applied to the pipe. The bent-over panel 44 extends through the elongated aperture 42 to keep the halves from pulling apart when the second end portions are squeezed together to lock the clamp. The midsections 14 include holes 32 to permit a fastener to be inserted through the hole to affix the clamp to a structural component.

A sixth embodiment shown in FIG. 8 differs from the other embodiments in that it consists of a single unitary piece of material. The midsection 14 of the piece extends circumferentially partially around the pipe, and each end of the piece includes the type of locking structure shown in FIG. 1. The midsection 14 includes one or more holes through which a fastener may be passed to affix the clamp to a structural component.

Thus, there has been described several embodiments of a new and useful improved pipe clamp. All of the embodiments use the double-interlocking snap-lock shown in FIG. 1. It is to be understood that additional embodiments will be obvious to those skilled in the art. The embodiments described herein together with those additional embodiments are considered to be within the scope of the invention.

What is claimed is:

1. An element of a clamp suitable for affixing a pipe to a wall, ceiling or other structural component, the clamp being of the type consisting of two associated elements disposed on opposite sides of the pipe and facing each other, extending circumferentially around the pipe and interlocking to embrace the pipe to secure it to the structural component, each of the two associate elements including a first end portion, a midsection, and a second end portion, the two associated elements having identical second end portions, said element comprising in combination:

a stiff non-planar sheet-like unitary structure of uniform thickness, having a first end portion, a midsection, and a second end portion;

said first end portion including couplings means for interconnecting said first end portion with the first end portion of the associated element;

said midsection shaped to contact the pipe and to extend circumferentially partially around the pipe;

said second end portion disposed to extend outwardly from the pipe when said element is applied to the pipe, and including a locking edge extending parallel to the pipe and further including a tab extending from said second end portion toward the associated element in a plane perpendicular to the pipe, said tab including a ramp relieved by a recess to provide a hook for engaging the locking edge of the associated element;

said element being sufficiently resilient that as the opposite second end portions of said element and an associated element are squeezed together, the ramp of each element is deflected to ride over the locking edge of the other element until the locking edge of each element snaps into the recess of the other element to produce a double interlocking of the elements embracing the pipe.

2. The element of claim 1 wherein, as the opposite second end portions of said element and an associated element are squeezed together, an elastic restoring force is produced which biases the recess of each tab against the locking edge of the opposite element when the elements have been interlocked.

3. The element of claim 1 wherein said midsection includes portions defining a hole sized to permit a fastener to be passed through the hole to affix the element to a structural component.

4. The element of claim 1 wherein said first end portion further comprises portions defining a hole so located on said first end portion that when said element and an associated element are disposed on opposite sides of the pipe and facing one another, the holes on the first end portions of the element and of the associated element are aligned to permit the element and the associated element to be connected by a fastener which passes through the holes.

5. The element of claim 4 wherein the fastener affixes the element and the associated element to a structural component.

6. The element of claim 1 wherein said first end portion further comprises a locking edge and a tab similar to those of said second end portion of the element.

7. The element of claim 1 wherein said first end portion of the element and the first end portion of the associated element are adapted to interlock when said element and the associated element are disposed on opposite sides of the pipe and facing one another.

8. The element of claim 1 wherein said locking edge is part of said second end portion which defines a notch in said second end portion.

9. The element of claim 1 wherein said tab further includes more than one hook spaced along said tab.

10. The element of claim 1 wherein said ramp is arched convexly.

11. A clamp suitable for affixing a pipe to a wall, ceiling or other structural component, said clamp being of the type which extends circumferentially around the pipe and has ends which interlock to embrace the pipe to secure it to the structural component, said clamp comprising:
a stiff non-planar sheet-like unitary structure of uniform thickness having a first end portion, a midsection, and a second end portion;
said midsection shaped to contact the pipe and to extend circumferentially partially around the pipe;
said first end portion and said second end portion disposed to extend outwardly from the pipe when the clamp is in use, said first and second end portions each including a locking edge extending parallel to the pipe, and each further including a tab extending in such a direction that when the clamp is in use the tabs extend toward each other in a plane perpendicular to the pipe, each of said tabs including a ramp relieved by a recess to provide a hook for engaging the locking edge at the opposite end of the clamp;
said clamp being sufficiently resilient that as the opposite ends of the clamp are squeezed together, the ramp of the tab of the first end portion is deflected to ride over the locking edge of the second end portion and the ramp of the tab of the second end portion is simultaneously deflected to ride over the locking edge of the first end portion, until the locking edges of each of the end portions snap substantially simultaneously into the recesses of the other end portions to produce a double interlocking of the elements embracing the pipe.

12. The clamp of claim 11 wherein as said first end portion and said second end portion are squeezed together, an elastic restoring force is produced which biases the recesses of the tabs against their respective locking edges when said first end portion and said second end portion have snapped into locking engagement.

13. The clamp of claim 11 wherein said midsection includes portions defining a hole sized to permit a fastener to be passed through the hole to affix the clamp to a structural component.

14. The clamp of claim 11 wherein said locking edges are parts of said first end portion and said second end portion respectively which define notches in said first end portion and in said second end portion respectively.

15. The clamp of claim 11 wherein each of the tabs further includes more than one hook spaced along the tab.

16. The clamp of claim 11 wherein each of the ramps is arched convexly.

* * * * *